United States Patent
Pfnuer et al.

(10) Patent No.: US 9,939,580 B2
(45) Date of Patent: Apr. 10, 2018

(54) OPTICAL COMPONENT ALIGNMENT USING INVERTED CARRIER MEMBER

(71) Applicant: Cisco Technology, Inc., San Jose, CA (US)

(72) Inventors: Stefan Martin Pfnuer, San Jose, CA (US); Matthew Joseph Traverso, Santa Clara, CA (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/203,571

(22) Filed: Jul. 6, 2016

(65) Prior Publication Data
US 2018/0011247 A1    Jan. 11, 2018

(51) Int. Cl.
*G02B 6/12* (2006.01)
*G02B 6/42* (2006.01)

(52) U.S. Cl.
CPC ....... *G02B 6/12002* (2013.01); *G02B 6/4245* (2013.01); *G02B 6/4274* (2013.01); *G02B 2006/121* (2013.01); *G02B 2006/12102* (2013.01); *G02B 2006/12121* (2013.01)

(58) Field of Classification Search
None
See application file for complete search history.

(56) References Cited

U.S. PATENT DOCUMENTS

| | | | | |
|---|---|---|---|---|
| 5,319,725 A | * | 6/1994 | Buchmann | G02B 6/12004 385/14 |
| 5,621,837 A | * | 4/1997 | Yamada | G02B 6/42 385/88 |
| 6,324,314 B1 | * | 11/2001 | Ukechi | G02B 6/4224 385/14 |
| 7,522,648 B2 | * | 4/2009 | Park | G02B 6/4232 372/50.1 |

(Continued)

OTHER PUBLICATIONS

Luxtera, "Next Gen 100G Interconnect, Technical Feasibility Using Silicon Photonics," downloaded from <http://www.ieee802.org/3/100GNGOPTX/public/nov11/palkert_01_1111_NG100GOPTX.pdf#page=5> on Jul. 6, 2016, 12 pages.

(Continued)

*Primary Examiner* — Mike Stahl
(74) *Attorney, Agent, or Firm* — Patterson+Sheridan, LLP (57) ABSTRACT

Embodiments include an optical apparatus and associated method of assembling. The optical apparatus comprises a substrate defining a first surface and a channel formed relative thereto, the substrate including one or more waveguides extending to a sidewall partly defining the channel, a plurality of first electrical contacts formed on the first surface. The optical apparatus further comprises a carrier member defining a second surface and at least a third surface, the second surface coupled with the first surface of the substrate. The optical apparatus further at least one optical component coupled with the second surface and at least partly disposed within the channel, wherein the at least one optical component is optically coupled with the one or (Continued)

more waveguides and electrically connected with the first electrical contacts via a plurality of second electrical contacts at the third surface of the carrier member.

18 Claims, 7 Drawing Sheets

(56) References Cited

U.S. PATENT DOCUMENTS

| | | | | |
|---|---|---|---|---|
| 8,548,292 | B2* | 10/2013 | Rogers | G02B 6/30 385/129 |
| 2007/0280585 | A1* | 12/2007 | Warashina | G02B 6/43 385/14 |
| 2013/0209033 | A1* | 8/2013 | Luff | G02B 6/1228 385/28 |
| 2014/0133864 | A1* | 5/2014 | Asghari | G02B 6/423 398/141 |

OTHER PUBLICATIONS

Black et al., "3D processing technology and its impact on iA32 microprocessors," Proceedings. IEEE International Conference on Computer Design: VLSI in Computers and Processors, 2004, pp. 316-318.

* cited by examiner

OPTICAL COMPONENT ALIGNMENT USING INVERTED CARRIER MEMBER

TECHNICAL FIELD

Embodiments presented in this disclosure generally relate to aligning and mounting an active light-generating device or die, e.g., a semiconductor laser or amplifier, with photonics circuitry comprising a plurality of waveguides.

BACKGROUND

Transceivers or other electrical circuitry having integrated optical components, e.g., a transmit optical subassembly (TOSA) of a transceiver, generally require assembly and attachment of the various components such as a laser component with electrical and photonics chips. Arranging the individual components to have a small collective footprint can provide several benefits such as electrical power savings, improved performance, and a reduced package size.

To minimize the footprint, it may be ideal to attach the laser component and electrical chip onto the same photonic chip using direct solder connections. However, in some cases a direct solder attachment is not feasible, e.g., due to varying temperature requirements for different solders and the potential for contaminating the laser component through reflow and cleaning processes.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an optical apparatus comprising a substrate defining a first surface and a channel formed relative thereto, the substrate including one or more waveguides extending to a sidewall partly defining the channel, a plurality of first electrical contacts formed on the first surface. The optical apparatus further comprises a carrier member defining a second surface and at least a third surface, the second surface coupled with the first surface of the substrate. The optical apparatus further comprises at least one optical component coupled with the second surface and at least partly disposed within the channel, wherein the at least one optical component is optically coupled with the one or more waveguides and electrically connected with the first electrical contacts via a plurality of second electrical contacts at the third surface of the carrier member.

Another embodiment is a method of assembling an optical apparatus. The method comprises attaching at least one optical component with a first surface of a carrier member, and electrically coupling the at least one optical component with a plurality of first electrical contacts extending from the first surface to a second surface of the carrier member. The method further comprises coupling the first surface of the carrier member with a third surface of a substrate, whereby the at least one optical component is at least partly disposed within a channel defined within the substrate relative to the third surface, and optically coupling the at least one optical component with one or more waveguides extending to a sidewall of the substrate, the sidewall partly defining the channel. The method further comprises attaching the carrier member with the substrate and electrically coupling the first electrical contacts of the carrier member with a plurality of second electrical contacts formed on the third surface of the substrate.

Another embodiment is an optical apparatus comprising a substrate defining a first surface and a channel formed relative thereto, one or more sidewalls partly defining the channel, the substrate including one or more waveguides extending to the one or more sidewalls. The optical apparatus further comprises a carrier member defining a second surface coupled with the first surface of the substrate, and an optical arrangement comprising at least one optical component coupled with the second surface and at least partly disposed within the channel, the optical arrangement electrically coupled with a plurality of electrical contacts of the substrate. The optical arrangement is configured to receive first optical signals from the one or more waveguides and to provide second optical signals to the one or more waveguides.

Example Embodiments

Embodiments are generally directed to an optical apparatus comprising a substrate defining a first surface and a channel formed relative thereto. One or more sidewalls of the substrate define one or more portions of the channel, and one or more waveguides extend through the substrate to the one or more sidewalls. The optical apparatus further comprises a carrier member defining a second surface and having at least one optical component coupled with the second surface. When the second surface is coupled with the first surface of the substrate, the at least one optical component is at least partly disposed within the channel and configured to be optically coupled with the one or more waveguides.

A plurality of first electrical contacts is formed on the first surface of the substrate, which may be coupled with an electrical chip (also "integrated circuit" or IC). The carrier member further comprises a plurality of second electrical contacts formed at a surface of the carrier member and electrically connected with the first electrical contacts. In this way, the electrical chip may provide power and/or electrical signals to the optical component(s) attached with the carrier member.

The various embodiments discussed herein generally allow a photonic chip to be used as a common mounting platform for optical components and electrical chips, maintaining desired performance and power consumption while avoiding I/O count limitations.

The direct mounting of both optical components and electrical chips onto a photonics chip may not be compatible for various reasons. For example, bonding of a laser component using a AuSn solder typically requires a relatively high temperature (e.g., about 350° C.) relative to bonding of an IC using a SnAg solder (e.g., about 250° C.). Thus, due to the different process temperatures it may be beneficial to bond the laser component prior to bonding the IC. However, IC bonding typically includes reflow and cleaning processes involving flux usage, which tends to contaminate the nearby laser component.

In some embodiments described herein, the optical components are attached to a separate carrier member using an AuSn solder. Separately, the reflow process may be performed to attach the IC with the photonics chip, and then cleaned. After cleaning, the carrier member is attached to the photonics chip using an epoxy or other suitable adhesive.

Figure 1:
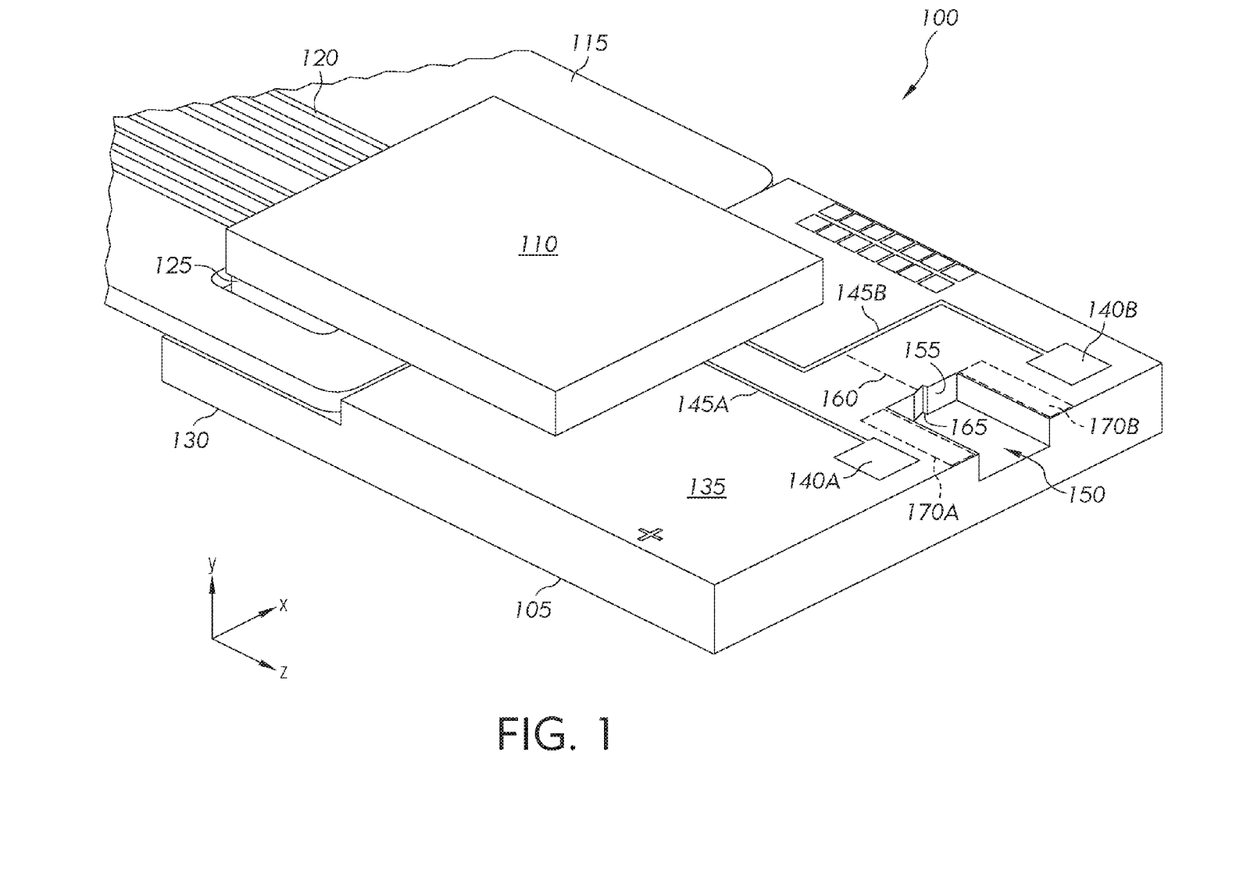
FIG. 1 illustrates an exemplary apparatus comprising a substrate that defines a channel and includes one or more waveguides, according to one embodiment.

FIG. 1 illustrates an exemplary apparatus comprising a substrate that defines a channel and includes one or more waveguides, according to one embodiment. Apparatus 100 includes a substrate 105 and flexible printed circuit board (PCB) 115 coupled with an integrated circuit (IC) 110. The substrate 105 may also be referred to as a photonic chip and may be formed of any suitable material. In some embodiments, the substrate 105 is comprised of silicon or another semiconductor material. Advantageously, the choice of material for the substrate 105 allows precision etching techniques to define openings and other surfaces of the substrate 105, and the well-controlled features of the substrate 105 improve its suitability for performing optical alignment with other optical components. For example, the sidewall 155 and other surfaces of the substrate 105 may be defined using deep reactive-ion etching (DRIE) or other anisotropic etching techniques. Features produced using DRIE can have accuracy to about ±1 micron.

The substrate 105 defines a surface 135 and a channel 150 formed relative to the surface 135. While surface 135 is shown as substantially planar within the X-Z plane, the surface 135 may have any suitable profile, e.g., one or more portions extending from or recessed into a planar surface. The channel 150 is formed to a predetermined depth from the surface 135 (e.g., in the Y-dimension) and laterally defined by one or more sidewalls 155 (e.g., in the X and Z-dimensions). While channel 150 is shown as substantially planar within the X-Z plane, the channel 150 may have any suitable profile for accommodating optical components, their electrical connections, etc. Further, channel 150 is shown as extending in the positive Z-direction to an endface of the substrate 105, but other embodiments of substrate 105 may enclose the channel 150 within the areal extent of the substrate 105, e.g., including another sidewall 155.

The substrate 105 includes one or more waveguides 160, which are shown as a dashed line to indicate being located beneath the surface 135 of the substrate 105 (i.e., in the negative Y-direction). Although a single waveguide 160 is depicted, other embodiments may include a plurality of waveguides 160 having a predefined relative disposition within the substrate 105. Each waveguide 160 extends to one of the sidewalls 155 defining the channel 150. In some embodiments, the waveguide 160 extends to a tapered portion 165 of the sidewall 155. Generally, the tapered portion 165 may be included to improve optical coupling of the waveguide 160 with other optical components. For example, the tapered portion 165 may modify an optical diameter of the waveguide 160 to better match an aperture size of an associated optical component such as a laser component.

In embodiments, the surface 135 is configured to engage with a surface of a carrier member coupled with one or more optical components. When the surfaces are engaged, the one or more optical components coupled with the carrier member are at least partly disposed within the channel 150, and may then be aligned with the waveguides 160 through passive or active alignment processes before attaching the carrier member with the substrate 105. As shown, bonding areas 170A, 170B are arranged on the surface 135 in a lateral outward direction from the channel 150. The bonding areas 170A, 170B may have any suitable form for bonding or otherwise attaching the carrier member with the substrate 105, e.g. grooves etched into the surface 135 and configured to receive an adhesive such as epoxy.

A plurality of electrical contacts 140A, 140B are formed on the surface 135 and are coupled with the IC 110 through conductive traces 145A, 145B. The plurality of electrical contacts 140A, 140B is generally configured to provide power and/or other electrical signals from the IC 110 to the optical components coupled with the attached carrier member. In one embodiment, a biasing voltage is provided through the electrical contacts 140A, 140B to a laser component coupled with the carrier member. Further discussion of electrical coupling with optical components is described below with respect to FIG. 3.

In some embodiments, the integrated circuit (IC) 110 is a "flip chip" having a plurality of conductive chip pads formed at a bottom surface (i.e., in the negative Y-direction) and generally configured to couple with corresponding conductive pads of the substrate 105 and flexible PCB 115 through a plurality of solder balls or bumps deposited onto the chip pads. A plurality of conductive traces 120 are included on the flexible PCB 115 and coupled with the conductive pads. As shown, an opening 125 is formed in the flexible PCB 115 and a protruding portion 130 of the substrate 105 extends through the opening 125. However, alternate embodiments may omit such an opening 125 and/or may omit the flexible PCB 115 entirely.

Generally, a flip chip implementation of IC 110 may be preferred for providing a large number of input/output (I/O) connections, which accommodates increased functionality of the IC 110. However, in alternate embodiments, wire bonding or other suitable bonding techniques may be used to electrically couple the IC 110 with the conductive traces 120, 145A, 145B.

In one alternate embodiment, the optical components and/or IC 110 include vertical via connections (e.g., through-silicon vias) to establish electrical connections to a routing substrate mounted on the backside of the optical components and/or IC 110. The backside of the relevant device (optical components and/or IC 110) is then electrically mounted via ball grid array (BGA) solder connection or any other standard chip mounting technique to establish electrical connection.

Figure 2A:
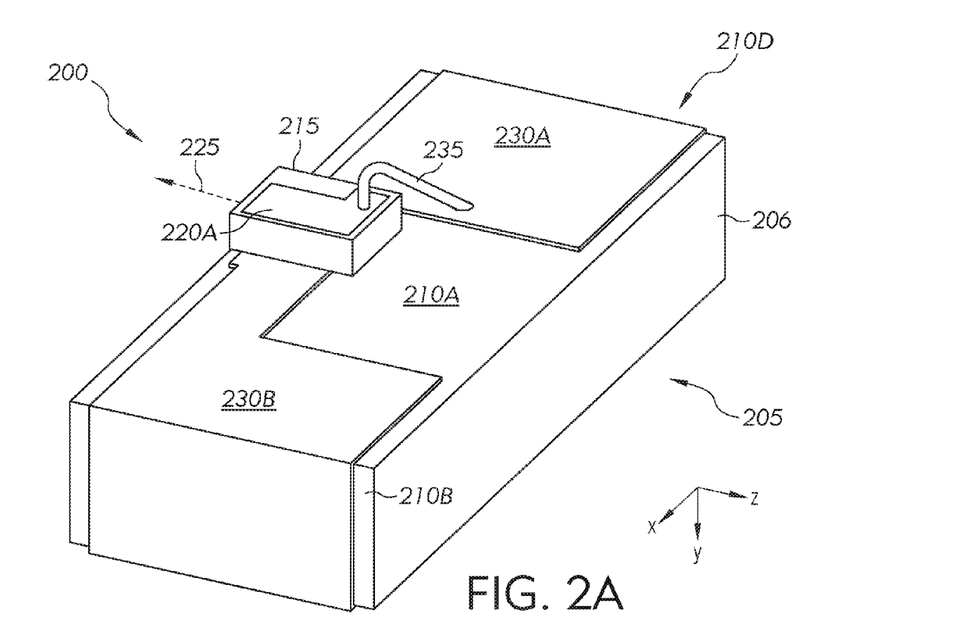
FIGS. 2A and 2B illustrate an exemplary carrier member configured to couple with the substrate, according to one embodiment.
Figure 2B:
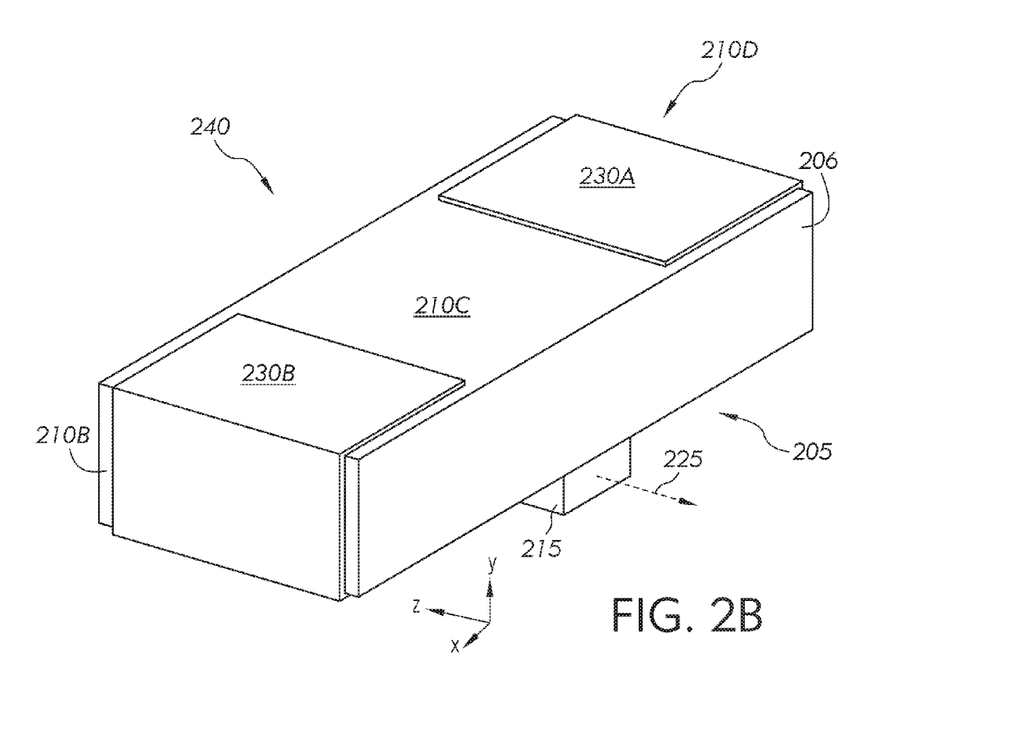

FIGS. 2A and 2B illustrate an exemplary carrier member configured to couple with the substrate, according to one embodiment. More specifically, views 200, 240 show a carrier member 205 from different perspectives.

The carrier member 205 comprises a carrier substrate 206 having a plurality of electrical contacts 230A, 230B formed thereon. The carrier substrate 206 is a monolithic, rectangular prism defining a plurality of surfaces 210A, 210B, 210C, 210D. Alternately, the carrier substrate 206 may include may include multiple portions and/or may have any suitable shape.

The electrical contacts 230A, 230B are formed at least partly on the surface 210A of the carrier substrate 206. As shown, the electrical contact 230B extends along an exterior of the carrier member 205 (i.e., along an exterior of the carrier substrate 206) along surfaces 210A, 210B, and 210C. The electrical contact 230A extends along the exterior of the carrier member 205 along surfaces 210A, 210D, and 210C.

At least one optical component 215 is coupled with the surface 210A. As shown, optical component 215 comprises a laser component configured to transmit an optical signal 225 into a waveguide 160 of a substrate 105 (FIG. 1) and including at least one electrical contact 220A for biasing the laser component. The optical component 215 may alternately be referred to as laser component 215, though it will be understood that optical component 215 may alternately represent a number of optical components of any suitable type(s). Although a single optical component 215 is depicted, other embodiments may include a plurality of optical components 215, e.g., arranged to optically couple with a plurality of waveguides 160 of substrate 105. For example, the carrier member 205 may include a plurality of laser components arranged with suitable spacing for coupling with different waveguides 160.

A wire bond 235 couples the electrical contact 220A with the electrical contact 230A formed on the surface 210A. The optical component 215 may include one or more additional electrical contacts, e.g., underneath the optical component 215 (i.e., in the positive Y-direction), for coupling with the electrical contact 230B.

The optical component 215 may be attached with the carrier member 205 using any suitable means. For example, the optical component 215 may be attached using an AuSn solder. In one embodiment, the optical component 215 is physically coupled with the surface 210A through the electrical contact underneath the optical component 215. In other words, when the optical component 215 is attached with the carrier member 205, at least a portion of the optical component 215 is seated against the electrical contact and is not seated directly against the surface 210A. In another embodiment, the optical component 215 is physically coupled directly with the surface 210A. The thicknesses (Y-dimension) of the electrical contacts 230A, 230B (as well as an electrical contact underneath the optical component 215) and/or the substrate 206 may be well-controlled to aid an optical alignment of the optical component 215 with waveguide 160 (FIG. 1).

In alternate embodiments, the electrical contacts 230A, 230B are vias extending through carrier substrate 206 between different surfaces of the carrier substrate 206, such as between surfaces 210A and 210C, between surfaces 210A and 210B, and so forth.

The substrate 206 may be formed of any suitable material, such as silicon or another semiconductor material, glass, ceramic, and so forth. In some embodiments, the material of the substrate 206 is selected to have a coefficient of thermal expansion (CTE) that is similar to that of the substrate 105 (FIG. 1) and/or optical component 215. In this way, a suitable optical coupling between the optical component 215 and the waveguide 160 (FIG. 1) may be maintained across a larger operational temperature range.

Figure 3:
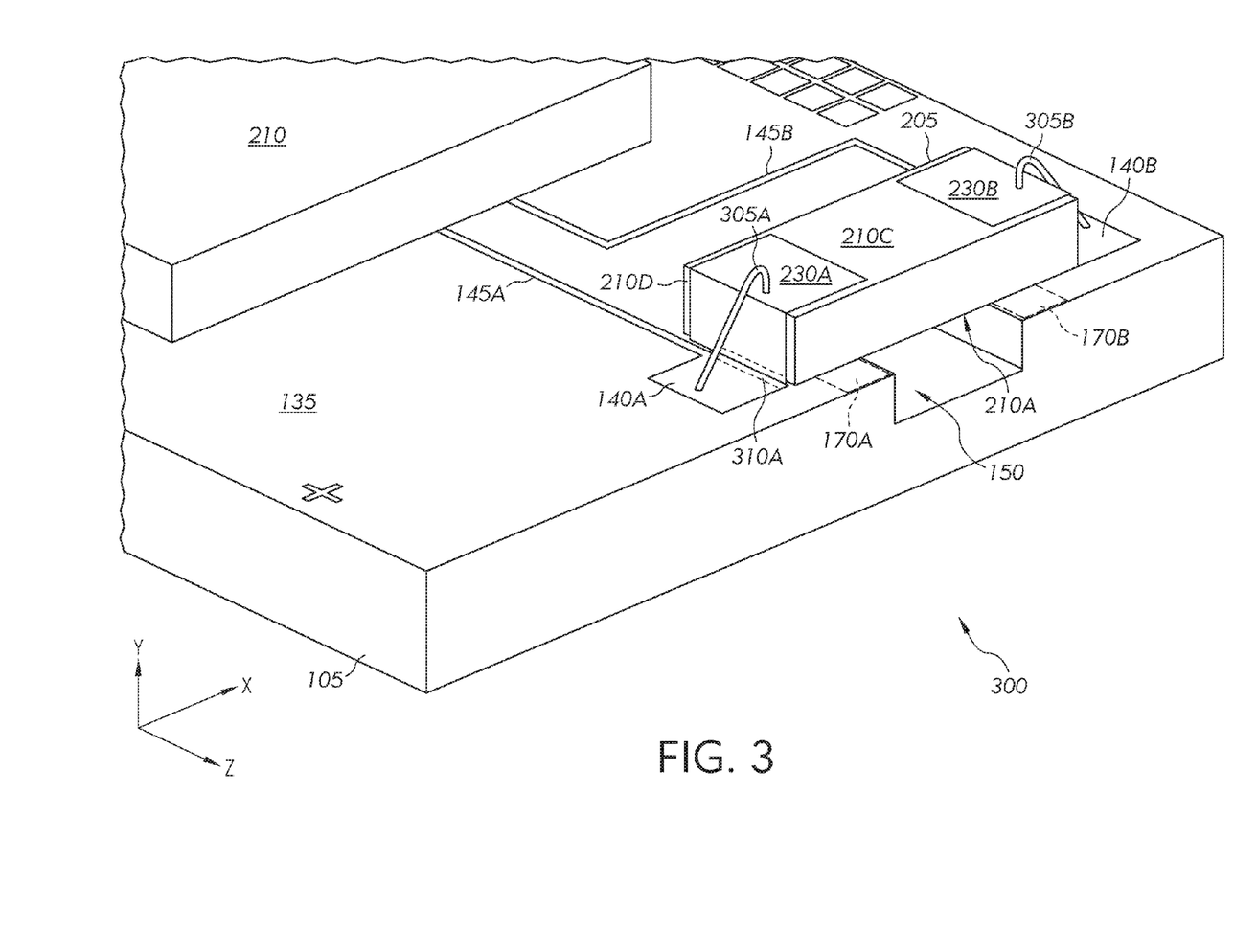
FIG. 3 illustrates an exemplary apparatus comprising the carrier member coupled with the substrate, according to one embodiment.

FIG. 3 illustrates an exemplary apparatus comprising the carrier member coupled with the substrate, according to one embodiment. Within apparatus 300, the carrier member 205 is coupled with surface 135 of the substrate 105. In some embodiments, surface 210A of the carrier member 205 is coupled directly with the surface 135. In other embodiments, electrical contacts 230A, 230B extend along the surface 210A, such that carrier member 205 is coupled with the surface 135 through the electrical contacts 230A, 230B.

Generally, the carrier member 205 may be coupled with the substrate 105 using a positioning device (not shown) that is removably coupled with the carrier member 205. The positioning device may have any suitable implementation, such as a sub-micron resolution multi-stage axis system. In some embodiments, the positioning device is used during a subsequent active alignment of optical component(s) 215 (coupled with the carrier member 205) with the waveguide(s) 160 of the substrate 105. After a peak optical coupling position is determined for the optical component(s) 215, the carrier member 205 may be attached with the substrate 105 at the bonding areas 170A, 170B, e.g., application and curing of epoxy within etched grooves, soldering, etc. The material used for bonding fills a relatively small gap (e.g., between about 0-50 microns or more) between bonding areas 170A, 170B and electrical contacts 230A, 230B. The relatively small gap allows an active alignment step to be performed. Further, within passive alignment implementations, a smaller gap may be present between bonding areas 170A, 170B and electrical contacts 230A, 230B.

Although not explicitly depicted, the optical component(s) 215 may be optically coupled with waveguides 160 using any suitable methods. In some embodiments, the optical component(s) 215 are "butt coupled" with waveguide(s) 160. As used herein, "butt coupling" refers to a relative disposition of the optical component(s) 215 and waveguide(s) 160 at or less than a threshold distance such that the optical coupling is suitable to meet performance requirements of the optical component(s) 215. The butt coupling may be through free space or another material, such as an adhesive having suitable optical properties. For example, the optical component(s) 215 may be a part of a high-speed optical modulator configured to communicate at data rates of 40 gigabits per second (Gbits/s), 100 Gbits/s, or more. In this case, one example of a suitable threshold distance is not more than 30 microns, such that the optical component(s) 215 and waveguide(s) 160 are considered "butt coupled" when disposed at a distance less than 30 microns. In another example, the threshold distance is less than 5 microns. In another example, the threshold distance is between 5 and 10 microns. In other embodiments, the optical component(s) 215 are optically coupled with waveguides 160 using one or more lens elements coupled with the carrier member 205 and/or the substrate 105.

The electrical contacts 230A, 230B of the carrier member 205 are electrically coupled with respective electrical contacts 140A, 140B formed on the surface 135. As shown, wire bond 305A couples electrical contacts 230A, 140A and wire bond 305B couples electrical contacts 230B, 140B. In one alternative embodiment, a conductive adhesive is applied to form a conductive interface 310A between electrical contact 230A at surface 210D and electrical contact 140A. A corresponding conductive interface may be formed between electrical contacts 230B, 140B. In another alternative embodiment, the electrical contacts 140A, 140B may be formed on the surface 135 at least partly beneath respective electrical contacts 230A, 230B, such that the electrical couplings between electrical contacts 140A, 230A and between electrical contacts 140B, 230B occur along the surface 210A of the carrier member 205.

Figure 4A:
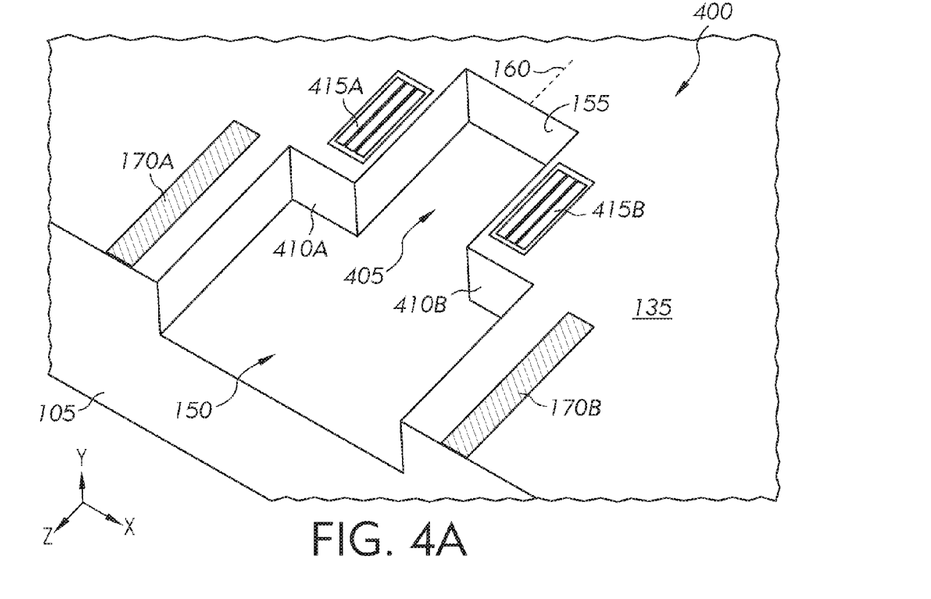
FIGS. 4A and 4B illustrates assembling a carrier member with a substrate configured to receive a lens component within a channel, according to one embodiment.
Figure 4B:
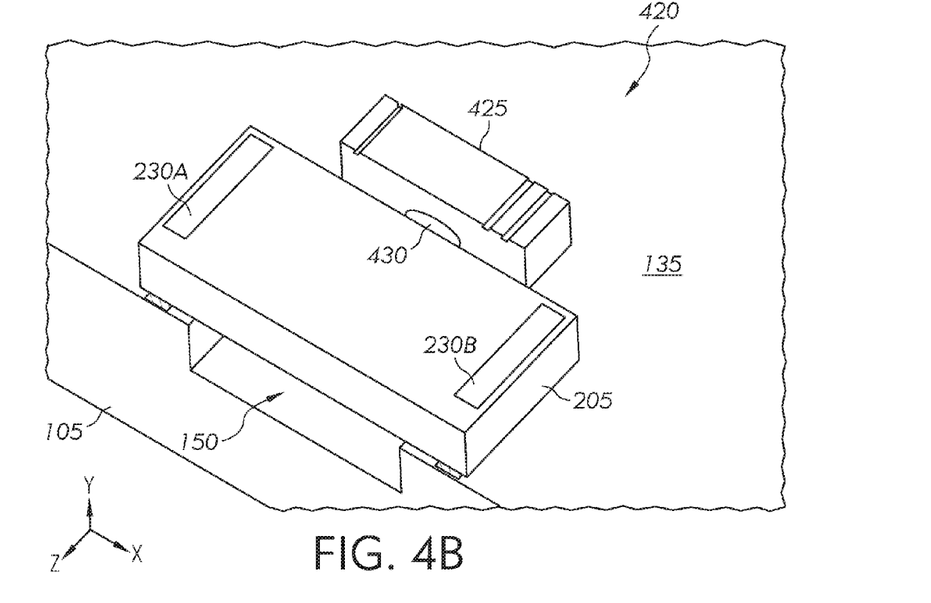

FIGS. 4A and 4B illustrates assembling a carrier member with a substrate configured to receive a lens component within a channel, according to one embodiment. Specifically, a lens subassembly 425 may be coupled with the substrate 105 such that a lens component 430 of the lens subassembly 425 is disposed within the optical path between an optical component (attached to the carrier member 205) and the waveguide 160. In an alternate implementation, the lens subassembly 425 and lens component 430 are integrally formed. Generally, disposing the lens component 430 within the optical path provides an alternative to butt coupling the optical component with the waveguide 160.

View 400 depicts an example embodiment of substrate 105 in which the channel 150 defines an extended portion 405. As shown, the extended portion 405 extends beyond a hypothetical X-Y plane connecting the sidewalls 410A, 410B to the sidewall 155. Bonding areas 415A, 415B are included on the surface 135 laterally outward from the extended portion 405. The bonding areas 415A, 415B may have any suitable form for bonding or otherwise attaching the lens subassembly 425 with the substrate 105, e.g. grooves etched into the surface 135 and configured to receive an adhesive such as epoxy.

In some embodiments, an alignment process is performed to optically couple the lens component 430 with the waveguide 160 prior to attaching the lens subassembly 425 with the substrate 105. The carrier member 205 is then coupled with the substrate 105, e.g., according to various techniques discussed above, and the attached optical component is optically coupled with the lens component 430 to provide a suitable optical coupling with the waveguide 160. In another embodiment, the carrier member 205 is pre-aligned and mounted before an active alignment and attachment of the lens component 430

Figure 5:
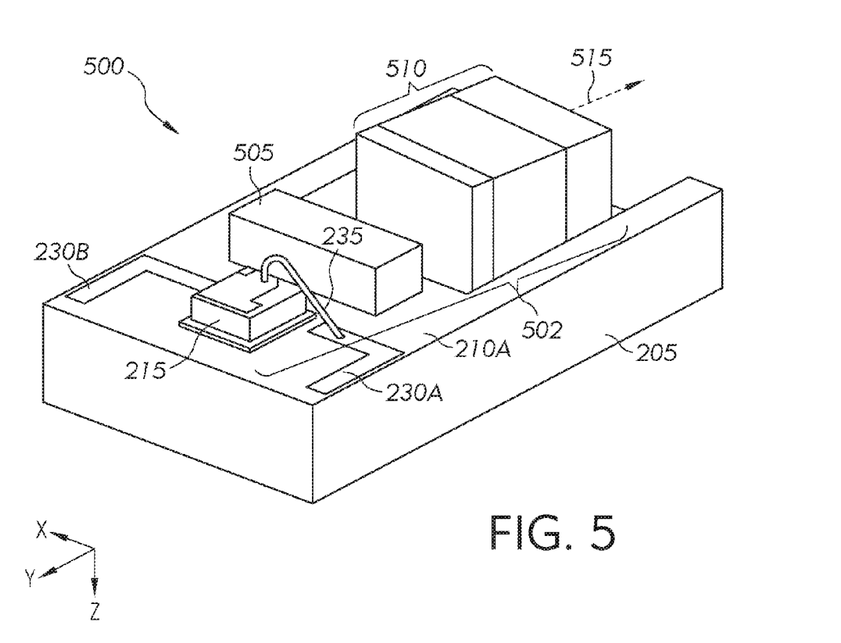
FIGS. 5-8 illustrate exemplary optical arrangements coupled with a carrier member, according to one embodiment.

FIGS. 5-8 illustrate exemplary optical arrangements coupled with a carrier member, according to one embodiment. Specifically, view 500 of FIG. 5 depicts an optical arrangement 502 coupled with the surface 210A of the carrier member 205. The optical arrangement 502 comprises a laser component 215, a lens 505, and an optical isolator 510, and is configured to provide an optical signal 515 capable of improved performance through an improved optical coupling with a waveguide 160. The optical isolator 510 generally protects the laser component 215 from any undesired backreflection into the laser component 215, which tends to degrade the transmission performance. In some embodiments, a second lens subassembly may be disposed on the surface 210A or the substrate 105 (e.g., as in FIG. 4B) to couple the optical signal 515 with a waveguide 160.

Figure 6:
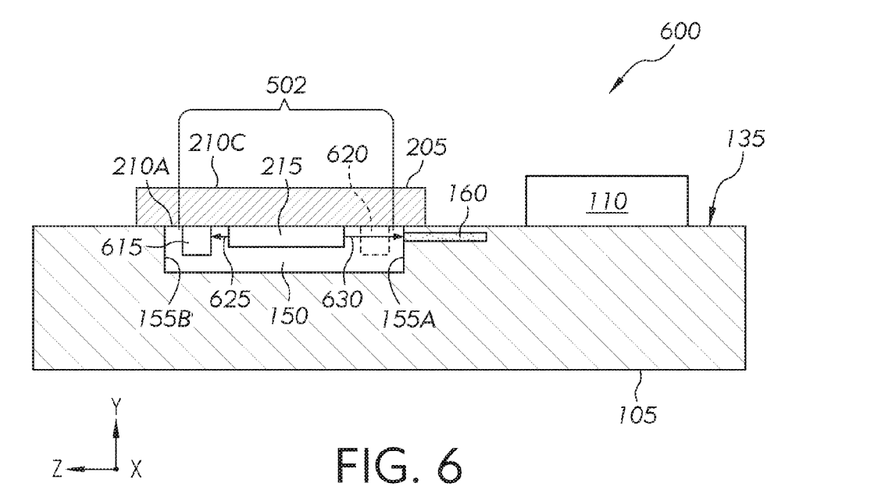

FIG. 6 illustrates a cross-sectional view 600 of an optical arrangement 502 comprising a laser component 215, a monitor photodiode 615, and an optional lens component 620. Channel 150 is bounded in the positive Z-direction by a sidewall 155B, and is bounded in the negative Z-direction by a sidewall 155A. A waveguide 160 extends to the sidewall 155A.

As discussed above, the laser component 215 may be optically coupled with the waveguide 160 using butt coupling, through the lens component 620, or through any other suitable techniques. The laser component 215 provides optical signals 630 to the waveguide using the optical coupling. The laser component 215 also provides optical signals 625 to the monitor photodiode 615, which are used to assess the performance of the laser component 215. Generally, over time, the output of the laser component 215 may degrade. Based on the received optical signals 625, the monitor photodiode 615 is used to adjust a biasing voltage of the laser component 215 to mitigate any degradation in the laser component's 215 output.

Figure 7:
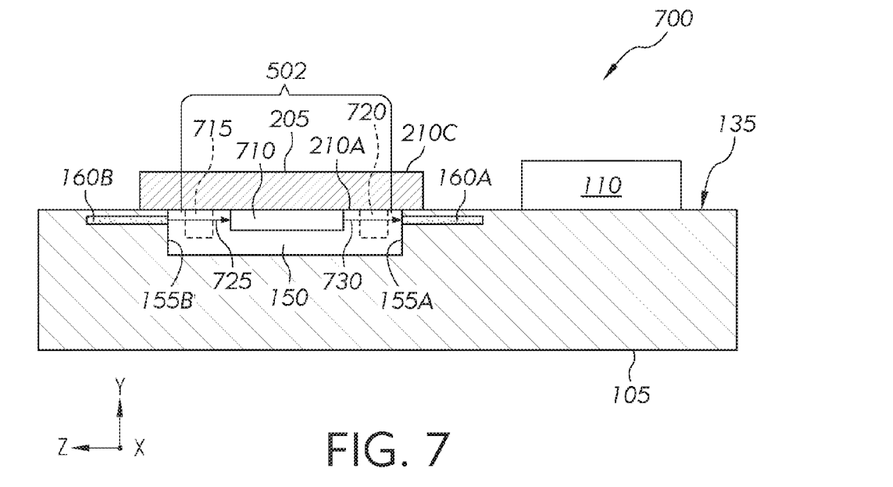

FIG. 7 illustrates a cross-sectional view 700 of an optical arrangement 502 comprising an optical amplifier 710 and optional lens components 715, 720. The optical amplifier 710 generally represents a semiconductor device configured to receive first optical signals 725 and produce second (amplified) optical signals 730. In one embodiment, the first optical signals 725 are provided from one of waveguides 160A, 160B and the second optical signals 730 are received at the other of waveguides 160A, 160B. The waveguide 160A extends to a first sidewall 155A of the substrate 105, and the waveguide 160B extends to a second sidewall 155B of the substrate 105 disposed opposite the first sidewall 155A (i.e., across the channel 150).

In some embodiments, the optical amplifier 710 is butt coupled with one or both of the waveguides 160A, 160B. In one example, the optical amplifier 710 is butt coupled with both of the waveguides 160A, 160B, and the lens components 715, 720 may be omitted. In another example, the optical amplifier 710 is butt coupled with one of the waveguides 160A, 160B, and one of the lens components 715, 720 is included to optically couple the optical amplifier 710 with the other of the waveguides 160A, 160B. In an alternate embodiment, one or both of lens components 715, 720 may be attached to the substrate 105 instead of surface 210A of the carrier member 205.

Figure 8:
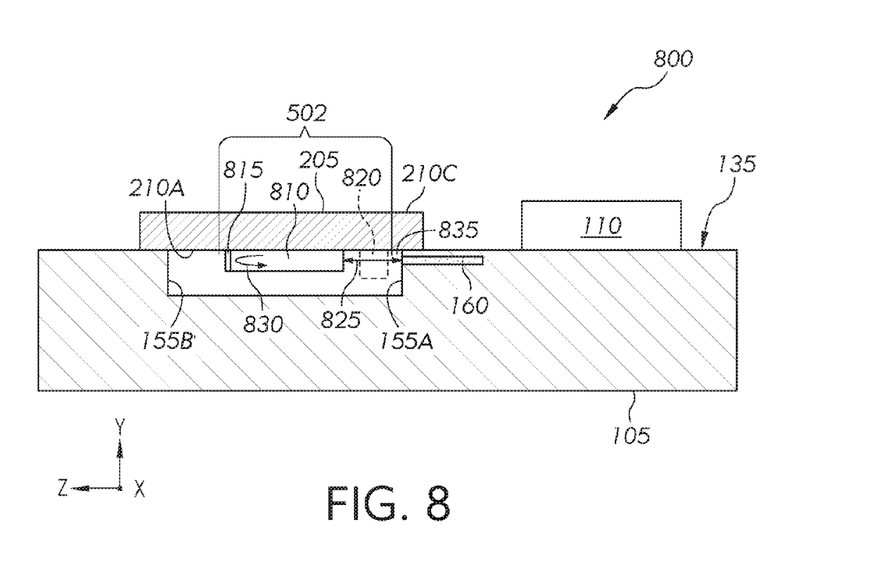

FIG. 8 illustrates a cross-sectional view 800 of an optical arrangement 502 comprising a reflective optical amplifier 810 and an optional lens component 820. The reflective optical amplifier 810 generally represents a semiconductor device configured to receive first optical signals 825 from a waveguide 160, which during the amplification process are reflected at a reflective surface 815 to produce reflected optical signals 830. The reflected optical signals 830 return through the reflective optical amplifier 810 and are output as second optical signals 835 to the waveguide 160. Within reflective optical amplifier 810, a standing optical wave is amplified based on an injected seed signal (e.g., first optical signals 825) of a predetermined wavelength. Amplification generally occurs as the standing optical wave travels in both directions within the reflective optical amplifier 810. In one example, the reflective optical amplifier 810 is butt coupled with waveguide 160, and the lens component 820 may be omitted. In another example, lens component 820 is included to optically couple the reflective optical amplifier 810 with the waveguide 160.

Figure 9:
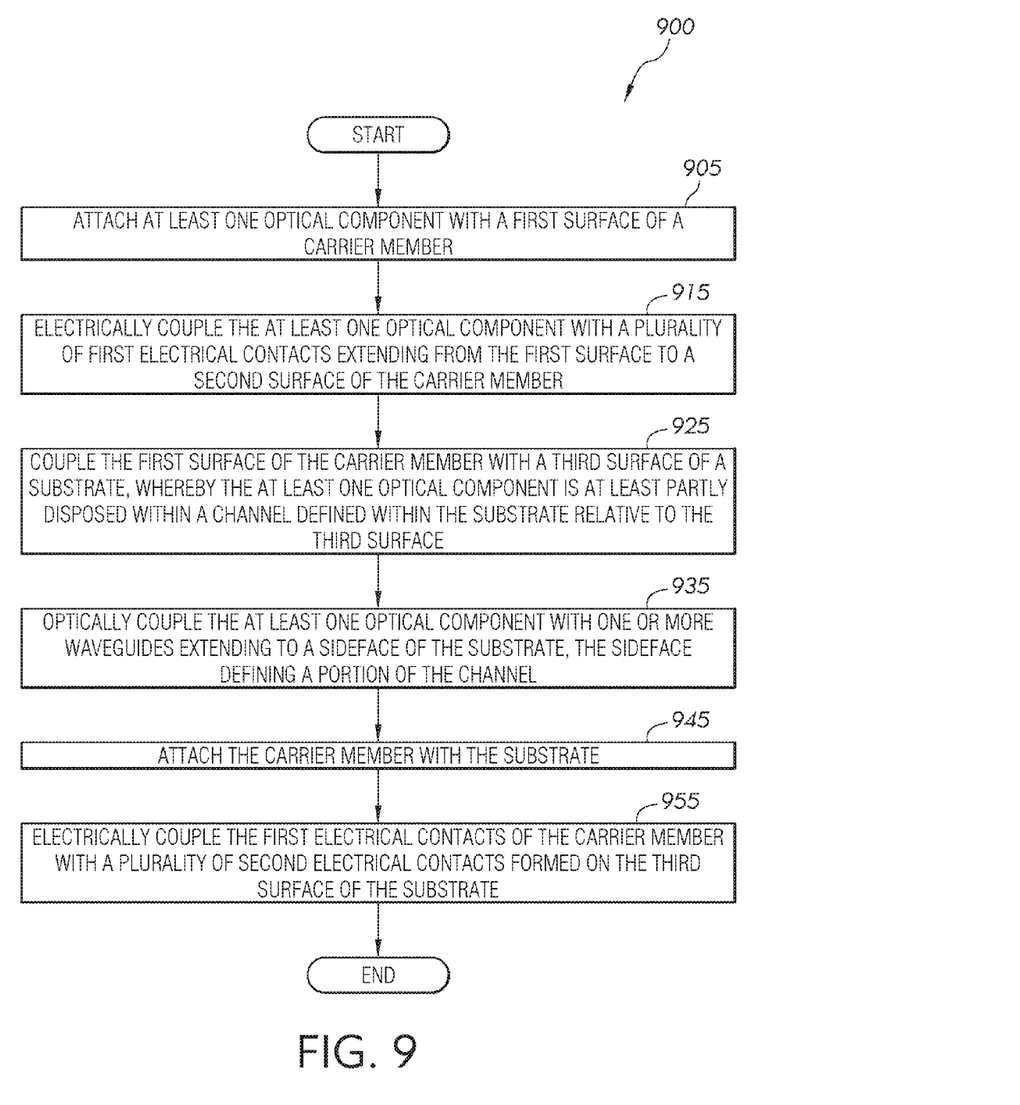
FIG. 9 is a method of assembling an optical apparatus, according to one embodiment.

FIG. 9 is a method of assembling an optical apparatus comprising a substrate and a carrier member, according to one embodiment. Method 900 may be performed using a positioning device removably coupled with the carrier member, as well as one or more bonding device(s) configured to apply an adhesive such as epoxy, to form wire bonds, etc.

Method 900 begins at block 905, where at least one optical component is attached with a first surface of a carrier member. The optical component may be a laser component or any suitable active and/or passive optical elements. During the attachment, the first surface may be oriented as a top surface of the carrier member.

At block 915, the at least one optical component is electrically coupled with a plurality of first electrical contacts extending from the first surface to a second surface of the carrier member. In some embodiments, the first electrical contacts wrap around an exterior of the carrier member. In other embodiments, the first electrical contacts are vias extending through the carrier member. The electrical coupling may be performed through wire bonding with the first electrical contacts. In some cases, attaching the optical component with the first surface of the carrier member (block 905) operates to electrically couple at least one of the first electrical contacts with the optical component. During the electrical coupling, the first surface may be oriented as a top surface of the carrier member.

At block 925, the first surface of the carrier member is coupled with a third surface of a substrate. The coupling of the first and third surfaces may be a sliding coupling. Generally, coupling the first surface with the third surface comprises inverting the carrier member, such that the first surface is reoriented as a bottom surface of the carrier member. When the first and third surfaces are coupled, the at least one optical component is at least partly disposed within a channel defined within the substrate relative to the third surface.

At block 935, the at least one optical component is optically coupled with one or more waveguides extending to a sidewall of the substrate, where the sidewall defines a portion of the channel. The optical coupling may be an active alignment process, during which the positioning device displaces and/or rotates the carrier member until a peak coupling is determined. At block 945, the carrier member is attached with the substrate. For example, a bonding device may dispense epoxy to form a physical interface rigidly coupling the first and third surfaces.

At block 955, the first electrical contacts are electrically coupled with a plurality of second electrical contacts formed on the third surface of the substrate. In some embodiments, a bonding device forms wire bonds between each of the first electrical contacts and a respective one of the second electrical contacts. In other embodiments, a bonding device applies an electrically conductive adhesive between the first and second electrical contacts. Method 900 ends following completion of block 955.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determine by the claims that follow.

We claim:

1. An optical apparatus comprising:
a substrate defining a first surface and a channel formed relative to the first surface, the substrate including one or more waveguides extending to a sidewall partly defining the channel, wherein a plurality of first electrical contacts are formed on the first surface;
a carrier member defining a second surface and at least a third surface, the second surface coupled with the first surface of the substrate; and
a plurality of optical components coupled with the second surface and at least partly disposed within the channel, wherein the plurality of optical components is optically coupled with the one or more waveguides and electrically connected with the first electrical contacts via a plurality of second electrical contacts at the third surface of the carrier member, and
wherein the plurality of optical components comprises a lens component and at least one other optical component, wherein the at least one other component is optically coupled with the one or more waveguides through the lens component.

2. The optical apparatus of claim 1, wherein the first electrical contacts and second electrical contacts are electrically connected via a selected one of (i) wire bonding and (ii) an electrically conductive adhesive.

3. The optical apparatus of claim 1, wherein the at least one other optical component comprises a laser component, wherein the plurality of first electrical contacts provide a biasing voltage for the laser component.

4. The optical apparatus of claim 1, wherein the second surface and third surface are disposed on opposing sides of the carrier member.

5. The optical apparatus of claim 4, wherein the plurality of second electrical contacts comprises a plurality of vias extending through the carrier member between the second surface and third surface.

6. The optical apparatus of claim 4, wherein the plurality of second electrical contacts extends between the second surface and the third surface along an exterior of the carrier member.

7. A method of assembling an optical apparatus, the method comprising:
attaching a plurality of optical components with a first surface of a carrier member, wherein the plurality of optical components comprises a lens component and at least one other optical component;
electrically coupling the at least one optical component with a plurality of first electrical contacts extending from the first surface to a second surface of the carrier member;
coupling the first surface of the carrier member with a third surface of a substrate, whereby the at least one optical component is at least partly disposed within a channel defined within the substrate relative to the third surface;
optically coupling, through the lens component, the at least one other optical component with one or more waveguides extending to a sidewall of the substrate, the sidewall partly defining the channel;
attaching the carrier member with the substrate; and
electrically coupling the first electrical contacts of the carrier member with a plurality of second electrical contacts formed on the third surface of the substrate.

8. The method of claim 7, wherein electrically coupling the first electrical contacts with the second electrical contacts comprises a selected one of (i) performing wire bonding and (ii) applying an electrically conductive adhesive.

9. The method of claim 7, wherein the at least one other optical component comprises a laser component, wherein the plurality of second electrical contacts provide a biasing voltage for the laser component.

10. The method of claim 7, wherein the first surface and second surface are disposed on opposing sides of the carrier member.

11. The method of claim 10, wherein the plurality of first electrical contacts comprises a plurality of vias extending through the carrier member between the first surface and second surface.

12. The method of claim 10, wherein the plurality of first electrical contacts extends between the first surface and the second surface along an exterior of the carrier member.

13. An optical apparatus comprising:
a substrate defining a first surface and a channel formed relative to the first surface, wherein one or more sidewalls partly define the channel, wherein the substrate includes one or more waveguides extending to the one or more sidewalls;

a carrier member defining a second surface coupled with the first surface of the substrate; and an optical arrangement comprising a lens component and at least one other optical component that are coupled with the second surface and that are at least partly disposed within the channel, the optical arrangement electrically coupled with a plurality of electrical contacts of the substrate, the optical arrangement configured to:

receive first optical signals from the one or more waveguides; and provide second optical signals to the one or more waveguides.

14. The optical apparatus of claim 13, wherein the one or more sidewalls comprises a first sidewall and a second sidewall, wherein the first sidewall includes at least a first waveguide of the one or more waveguides, wherein the second sidewall includes at least a second waveguide of the one or more waveguides, wherein the first optical signals are received from the first waveguide, and wherein the second optical signals are provided to the second waveguide.

15. The optical apparatus of claim 13, wherein the at least one other optical component comprises an optical amplifier.

16. The optical apparatus of claim 13, wherein the at least one other optical component of the optical arrangement is butt coupled with at least one of the one or more waveguides.

17. The optical apparatus of claim 1, wherein the sidewall defines a tapered portion configured to modify an optical diameter of the one or more waveguides.

18. The method of claim 7, wherein the sidewall defines a tapered portion configured to modify an optical diameter of the one or more waveguides.

* * * * *